INVENTORS
PIERRE PONCET
RENÉ TREMPU

US Patent 3,848,058 — Patented Nov. 12, 1974

PURIFICATION OF GASEOUS STREAMS CONTAINING SULFUR DERIVATIVES

Pierre Poncet, Lyon, and René Trempu, Versailles, France, assignors to Compagnie Industrielle des Télécommunications Cit-Alcates, Paris, France
Filed May 28, 1971, Ser. No. 147,933
Claims priority, application France, Aug. 5, 1970, 7028877; Feb. 19, 1971, 7105765
Int. Cl. B01d 53/34
U.S. Cl. 423—242
3 Claims

ABSTRACT OF THE DISCLOSURE

A continuous method for purifying a gaseous stream containing sulfur derivatives derived from fuel combustion comprising (a) providing an aqueous cleaning solution consisting essentially of ferric sulfate in a contacting zone; (b) contacting, in said contacting zone, said gaseous stream with said aqueous cleaning solution; and (c) repeating steps (a) and (b) is disclosed. Iron can be added to neutralize any sulfuric acid and then the resulting aqueous solution can be oxidized.

---

Figure 1:
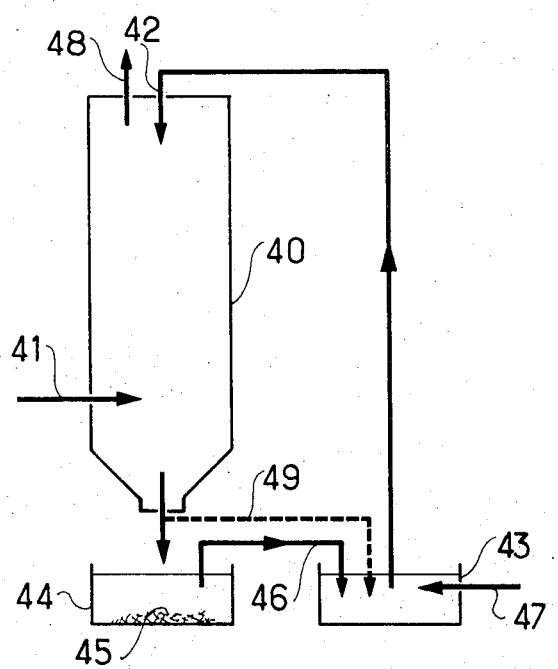

The invention concerns the physico-chemical purifying of smoke and gas contained in a gaseous stream, and more particularly of derivatives of sulfur, especially anhydrides of that metalloid, coming from the combustion of a fuel.

It is well-known that the combustion of a fuel has the effect of releasing in the atmosphere more or less great quantities of dust, more particularly of carbonaceous particles, as well as various gases such as derivatives of sulfur and oxides of nitrogen, for example.

Attempts have been made in numerous ways to remove such harmful dust and gas before releasing the exhaust gas into the atmosphere. But, up till now, the results obtained have not been satisfactory, especially inasmuch as concerns the above-mentioned residual gases.

Due to his research work, the present inventor has been able to work out a method enabling a practically complete removal of these harmful dusts and gases.

The object of the present invention is a physico-chemical method of purifying smoke and gas contained in a gaseous stream, and more particularly, derivatives of sulfur coming from the combustion of a fuel, this method comprising more particularly a cleaning of said stream by means of an aqueous solution, the absorption by the said solution of the gases to be purified and the action of iron or of an iron compound on the products absorbed, characterized in that the aqueous cleaning solution consists mainly of ferric sulfate.

Indeed, it has been noticed that the presence of ferrous ions in the cleaning solution could partly inhibit the oxidation phenomena required for obtaining proper purifying in sulfurous anhydride.

The principle of purifying sulfurous anhydride consists in transforming it into sulfate. This could be effected by the action of a catalyst by the use of the oxygen contained in the smoke and/or by blowing air into the smoke. Nevertheless, the results then obtained can be uncertain due, on the one hand, to the danger of poisoning the catalyst, and, on the other hand, to the variations in the quantities of oxygen present in the gas, depending on the adjustment of the boiler.

In order to obviate these drawbacks, the present inventor had the idea of using an oxido-reduction reaction between the sulfurous anhydride and the cleaning solution for oxidizing the sulfurous anhydride, the iron contained in this solution passing from the ferric state to the ferrous state.

Thus, where the cleaning solution is mainly ferric sulfate, the reaction obtained is:

$$(SO_4)_3Fe_2 + SO_2 \rightarrow 2SO_3 + 2FeSO_4 \quad (1)$$

This reaction can also be written thus:

$$(SO_3)_3Fe_2O_3 + SO_2 \rightarrow SO_3 + SO_3 + 2(FeO,SO_3) \quad (2)$$

This shows that in the oxido-reducing reaction, a molecule of $SO_2$ is transformed into $SO_3$ and a molecule of ferric sulfate gives rise to two molecules of ferrous sulfate and a molecule of $SO_3$.

The sulfuric anhydride is hydrated by the water contained in the cleaning solution.

Consequently, the cleaning solution collected contains ferrous sulfate and sulfuric acid. In order to make it suitable for use again in this solution for washing, the ferrous sulfate contained must be transformed into ferric sulfate.

According to one embodiment of the invention, to the solution thus collected is added iron and/or an iron compound, so as to neutralize the sulfuric acid contained therein, then the solution is oxidized before being used again for cleaning the gaseous stream to be purified.

The aim of the oxidation is to transform the ferrous sulfate into ferric sulfate; it can be brought about by blowing air therein.

So as to obtain good transformation, it is desirable to bring about this oxidation in sulfuric acid.

Diagrammatically, the reaction is then as follows:

$$2(FeO,SO_3) + SO_3 + 1/2 O_2 \rightarrow Fe_2(SO_3)_3O_3 \quad (3)$$

When the solution contains no sulfuric acid, iron oxide may then be formed, according to a process of the following type:

$$12(FeO,SO_3) + 3O_2 \rightarrow 2Fe_2O_3 + 4Fe_2(SO_3)_3O_3 \quad (4)$$

If, before oxidation, all the solution collected after cleaning has iron or an iron compound such as an iron carbonate added to it in a dispersed form, on account of the excess of iron or iron compound, all the free acid contained in the said solution is then neutralized. To bring about good oxidation, it would then be desirable to add sulfuric acid.

To avoid such an addition, according to the invention, only a fraction of the solution collected has iron and/or an iron compound added to it before oxidation, so as to neutralize the sulfuric acid contained in that fraction. The fraction thus treated is then oxidized in the fraction which has not been treated which contains sulfuric acid.

As two sulfuric anhydride molecules correspond, in the solution collected, to two ferrous sulfate molecules (reactions 1 and 2) and as the oxidation of these two ferrous sulfate molecules requires the presence of a sulfuric anhydride molecule (reaction 3), it can be noticed, then, that it is an advantage for the solution collected to be approximately in equal parts, one directly oxidized and the other having from and/or an iron compound added to it.

Figure 2:
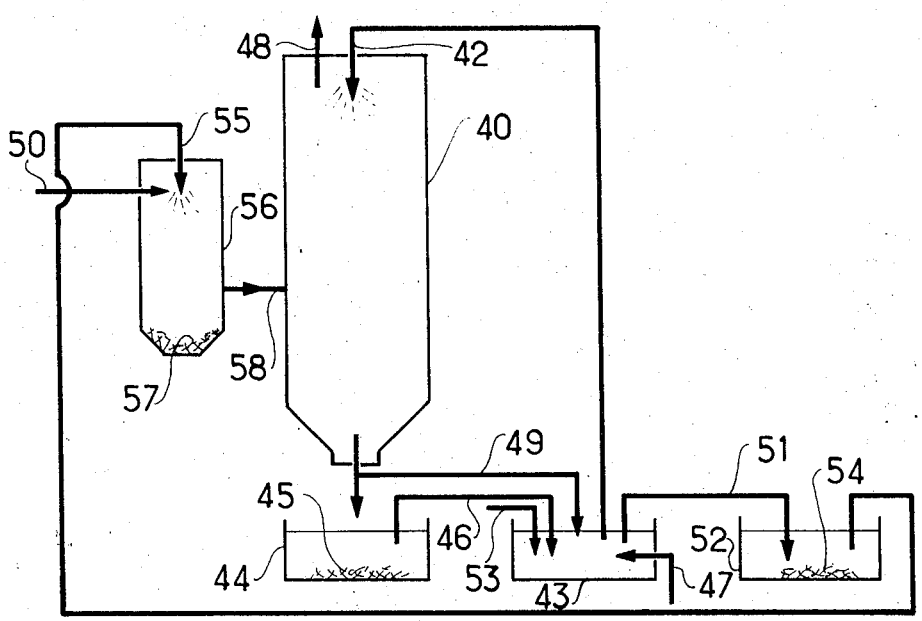

Other characteristics of the invention will become apparent from the following description and the attached drawing in which FIGS. 1 and 2 show, diagrammatically, methods of implementing the method according to the invention.

In these FIGS., reference 40 designates a container in which the gaseous stream to be purified is cleaned. This stream enters at 41. It is put in contact with a cleaning solution 42 brought into the container by means of appropriate spray jets. The cleaning solution is drawn off into a tank 43. According to the invention, it consists mainly, during its continual operation period, of ferric sulfate. At the outlet of the container 40, the solution is collected in a tank 44 where it has iron or an iron compound such as an iron carbonate in dispersed form, designated by reference 45, added to it, then it is brought at 46 into the tank 43, where it is oxidized by air brought in at 47.

The purified flow escapes from the container 40 at 48.

On leaving the container 40, the whole solution can be brought into the tank 44.

However, in a preferred embodiment, shown in FIG. 1 by intermittent lines, part of the solution is transferred directly at 49 to the tank 43.

At the start of the purifying process, the cleaning solution is, in actual fact, only an aqueous solution containing $Fe^{+2}$ and $Fe^{+3}$ ions, coming from finely divided iron or iron compound such as iron carbonate, for example. As soon as it comes into contact with the flow to be purified, this solution becomes charged with $SO_2$ which is transformed into ferrous sulfate and is then oxidized, in the tank 43, to form ferric sulfate.

The ferric sulfate thus formed is brought into the container 40 and it reacts as in reaction (1) with $SO_2$ contained in the flow to be purified.

Due to this fact, during the continual operation period, at the outlet of the container 40, the solution contains ferrous sulfate and sulfuric acid. The latter can be partly or completely neutralized, before oxidation of the ferrous sulfate, according to whether all, or only part of the solution coming from the container 40 is brought into the tank 44.

By way of an example, during the period of continual operation, the concentration of ferric sulfate in the cleaning solution can be on the order of 200 grams per liter.

The diagram in FIG. 2 differs from that in FIG. 1 in that the dehydrating of iron salts formed has been provided for by contact with the gaseous stream to be purified before it comes into the container 40.

According to this embodiment, when the concentration of the ferric sulfate solution contained in the tank 43 is near saturation point, a part of that solution is drawn off and poured at 51 into the tank 52, and a quantity of water approximately equivalent to the quantity of liquid drawn off may be added at 53 to the contents of the tank 43.

The solids residue 54 is allowed to settle in the tank 52. After decantation, the supernatant solution, which consists mainly of ferric sulfate is brought at 55 into a dehydrating container 56 where it is contacted with the gas stream to be purified which enters at 50.

The ferric sulfate is brought into the container 56 by means of appropriate spray jets.

The concentrated ferric sulfate is contacted with the gaseous stream which has not yet been purified, at a temperature on the order of 130 to 180° C.

After at least partial dehydration, in the container 56, a more or less muddy solid residue 57, containing soot and charcoal as well as iron salts from which, by way of a non-limiting illustration, iron oxide and $SO_2$ can be extracted by treating in an oven at about 650–750° C., are obtained.

After this dehydrating operation on the ferric sulfate, the gaseous flow, rid of a great proportion of solid particles and drawing away the water resulting from the dehydrating of the iron salt solution, is brought, at 58, into the container 40.

It is a great advantage to have the dehydrating container before the container in which the $SO_2$ is absorbed, for this makes it possible to bring the temperature of the flow to be purified to a value on the order of 45 to 60° C., thus promoting good absorption of the $SO_2$.

The purifying device, which, in the examples described, comprises only one cleaning container 40 can comprise several containers connected in series and/or in parallel.

The materials of which the purifying device is made should, of course, be capable of resisting the chemical and physico-chemical reactions of the various substances in the operating conditions.

The containers can be made of synthetic material, or metal covered with a plastic material, for example.

They can possibly be covered with an appropriate filling material, such as polyamide turnings or chips or like substances.

Of course, the invention is in no way limited to the embodiments described and illustrated, which have been given only by way of examples.

More particularly, without going beyond the scope of the invention, details may be modified, certain arrangements may be changed or certain means may be replaced by equivalent means.

What is claimed is:

1. A continuous process for purifying a gaseous stream derived from fuel combustion and containing sulfur dioxide by removing therefrom substantially all of the sulfur dioxide by a process which comprises:
   (1) feeding the impure gas stream into a first zone;
   (2) contacting said impure gas stream at a temperature of about 130 to 180° C., in said first zone, with a concentrated aqueous solution consisting essentially of ferric sulfate to at least partially dehydrate said concentrated aqueous solution, to remove a substantial portion of solid particles from said impure gas stream and to bring the temperature of said impure gas stream to 45 to 60° C.;
   (3) feeding the resulting gaseous stream from step (2) into a second zone;
   (4) countercurrently contacting said resulting gas stream in said second zone with a first aqueous solution consisting essentially of ferric sulfate to form a second aqueous solution containing sulfuric acid and ferrous sulfate and a purified gas stream substantially free of sulfur dioxide;
   (5) separating said second aqueous solution into a first and a second portion;
   (6) adding iron or an iron compound to only said first portion in an amount sufficient to neutralize the sulfuric acid contained therein to form a third aqueous solution consisting essentially of ferrous sulfate;
   (7) combining said third aqueous solution and said second portion and oxidizing the combined aqueous solution by contacting said combined aqueous solution with a gas consisting of air only, said oxidation being conducted in the presence of sulfuric acid due to the sulfuric acid remaining in said second portion;
   (8) withdrawing a portion of the resulting oxidized aqueous solution as a concentrated aqueous solution consisting essentially of ferric sulfate and feeding it to said first zone as said concentrated solution consisting essentially of ferric sulfate; and
   (9) feeding the remaining portion of the resulting oxidized aqueous solution to said second zone as said first aqueous solution consisting essentially of ferric sulfate; and
   (10) repeating steps (1) through (9) to obtain a continuous process.

2. The process of claim 1 wherein said first portion used in step (6) comprises about one-half of the aqueous solution produced from step (4).

3. The process of claim 1 wherein the ferric sulfate concentration of the ferric sulfate aqueous solution used in step (4) is about 200 g. per liter.

References Cited

UNITED STATES PATENTS

| | | | |
|---|---|---|---|
| 1,477,965 | 12/1923 | Leaver | 23—167 |
| 2,055,082 | 9/1936 | Keyes | 423—530 |
| 2,306,425 | 12/1942 | Bevan | 423—558 |

FOREIGN PATENTS

| | | | |
|---|---|---|---|
| 380,513 | 9/1932 | Great Britain | 23—25 Q |

EARL C. THOMAS, Primary Examiner

U.S. Cl. X.R.

423—530, 558